Jan. 29, 1952 M. L. JACOBS 2,583,945
TREE FELLING JACK
Filed Dec. 19, 1949
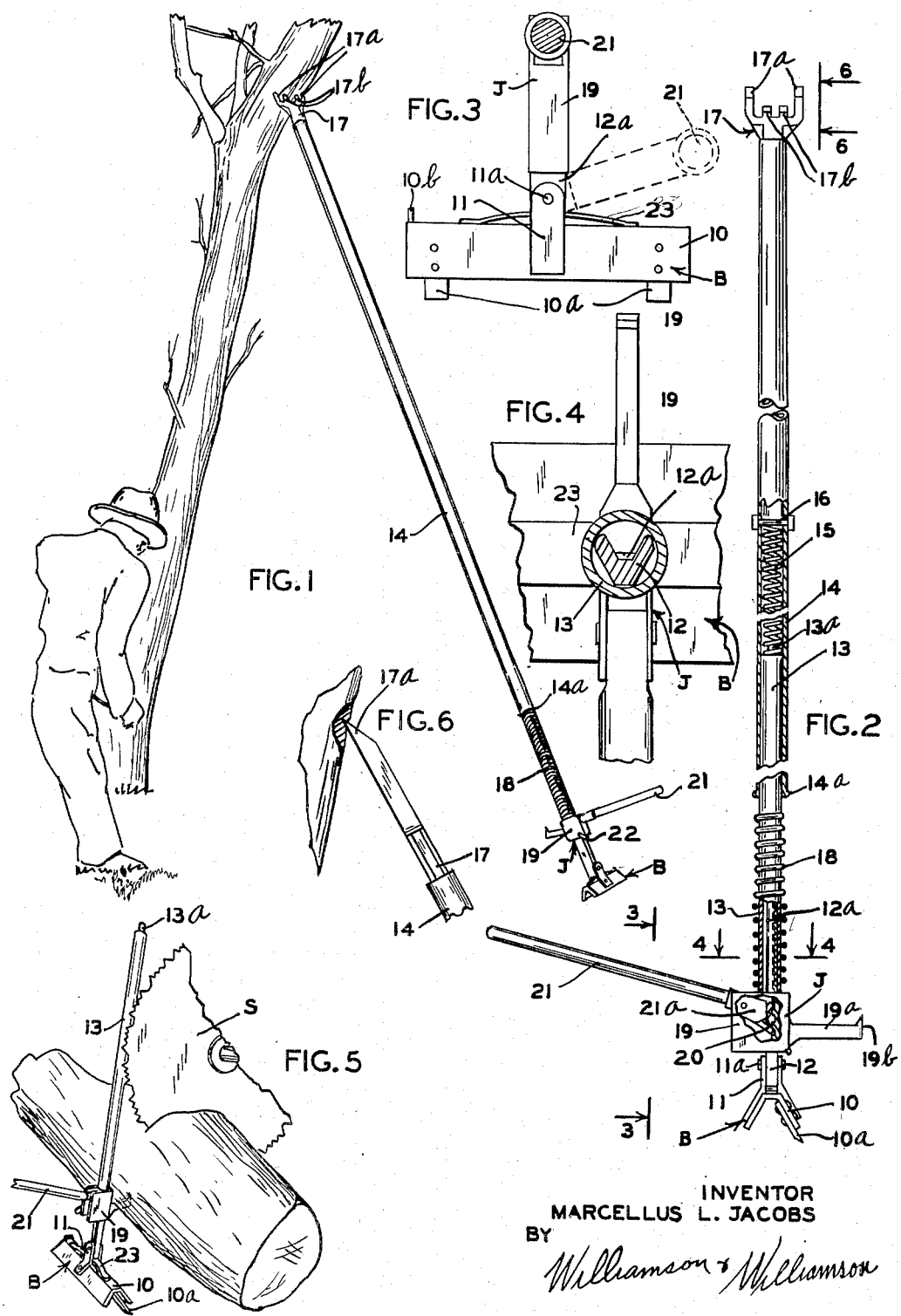
INVENTOR
MARCELLUS L. JACOBS
BY
Williamson & Williamson
ATTORNEYS Patented Jan. 29, 1952

2,583,945

UNITED STATES PATENT OFFICE 2,583,945

TREE FELLING JACK

Marcellus L. Jacobs, Minneapolis, Minn., assignor to Jacobs Wind Electric Company, Minneapolis, Minn., a corporation of Montana Application December 19, 1949, Serial No. 133,860

9 Claims. (Cl. 254—133)

This invention relates to a device for felling trees to bring about in conjunction with the sawing or other cutting of a tree at the trunk, felling of that tree in any desired direction.

It is an object of my invention to provide a simple, compact, tree-felling device utilizing a jack principle for imparting and continuing to impart a thrust against an upper portion of a tree from a point of ground anchorage to cause the tree when completely sawed at the trunk, to fall in any desired direction.

More specifically, it is an object to provide an elongated tree-felling jack having a ground-anchoring base and an elongated, longitudinally adjustable thrust pole swingably connected with said base and further, having mechanism for producing a variable and resilient thrust on the tree-engaging end of the pole to continuously apply thrust during the cutting operation and initial tilting of the tree.

A further object is the provision of a tree-felling jack of the class described wherein thrust is selectively and controllably applied from a point of ground anchorage to a tree or other object to be felled through the medium of two springs, one or both of which may be operatively interposed between the lower and upper sections of a longitudinally adjustable, sectional thrust pole or beam. The two springs are preferably of quite different strengths or compressibility and are so related with the sectional pole that the heavier spring may be adjusted to partially support and exert its thrust upon the cutting of the trunk to keep the kerf open and to prevent pressure against the saw while the lighter spring is operatively combined with the structure to produce "follow through" thrust for toppling the tree over and guiding or directing the tree during its fall.

These and other objects and advantages of my invention will be more apparent from the following description made in connection with the accompanying drawings, wherein like reference characters refer to similar parts throughout the several views and in which:

Fig. 1 is a perspective view showing an embodiment of my invention applied to a tree to directionally fell the same as the trunk is cut;

Fig. 2 is a side elevation of my tree-felling jack with some portions broken away and others shown in section;

Fig. 3 is a view mostly in front elevation of the anchoring base and lower portion of my device taken on the line 3—3 of Fig. 2;

Fig. 4 is a cross section taken on the line 4—4 of Fig. 2;

Fig. 5 is a view illustrating another use of my structure for facilitating the cutting up of a cut tree or log; and Fig. 6 is a detail side elevation showing the pronged thrust-applying head of my device.

As shown in the drawings, my tree-felling device includes a ground-anchoring base B, as shown, comprising an inverted, generally V-shaped channel member 10 having secured to one of the upstanding webs thereof, a plurality of depending ground-penetrating blades 10a. A clevis saddle 11 is intermediately secured to the channel member 10 having spaced, upstanding lugs 11a between which the flatted lower extremity 12a of a jack post element 12 is pivoted by suitable means such as the heavy pivot pin 11a.

The jack post 12 as shown, is of V-shaped cross section (see Fig. 4) and is provided interiorly with a series of rack teeth 12a adapted to be progressively engaged by the dog of a conventional jack device. The jack device indicated as an entirety by the letter J is mounted on jack post 12 with the handle thereof extending transversely to the anchoring base B. Jack J, as shown, has affixed preferably rigidly as by welding, to the upper end thereof, a rigid slide tube 13 which as shown, is somewhat longer than the jack post 12 and which is telescoped over the jack post, slidably engaging the same for longitudinal adjustment relative thereto.

Slide post 13 has detachably and slidably telescoped thereover, a tubular thrust pole section 14 of considerable length and as shown, this thrust pole is provided in its intermediate portion with an internal coil thrust-applying spring 15 secured to the post 14, as shown by a diametrically nutted bolt 16. The upper end of the slide tube 13 as shown, is closed and provided with an axial nipple 13a which when the device is assembled for tree felling, seats within the lower end of the thrust-applying spring 15.

The upper end of the thrust pole section 14 has a forked, thrust-applying head 17 preferably rigidly affixed thereto, said head as shown in Figs. 2 and 6 comprising a pair of widely spaced prongs 17a preferably beveled at one side of the head to provide sharpened edges for penetration into the trunk or branches of a tree. A second pair of relatively short, similarly beveled prongs 17b are provided in head 17 disposed in spaced relation intermediately of the longer prongs 17a. The relationship of the two sets of prongs, facilitates penetrative engagement of the cylindrcial contour of a tree trunk or large branch.

An elongated coil spring 18 of somewhat heavier construction and compression resistance, as contrasted with the thrust-applying spring 15, surrounds the slide tube 13 and is freely slidable thereon, having its lower end abutted against a base collar of the slide tube. This spring 18 is somewhat shorter in uncompressed state than the slide tube and is adapted when desired, through adjustment of the jack J to engage and thrust at its upper end against a thrust-receiving collar 14a provided at the lower end of the thrust post. The relationship of coil springs 15 and 18 and the cooperating parts of the assembled structure is such, that upon upward adjustment of the jack J, thrust is first applied by the slide tube 13 to the lighter internal spring 15 to first apply compression thereto and upon further upward adjustment of the jack, spring 18 is thrust against the lower end of tubular thrust section 14, thereafter applying compression upon the heavier spring 18. Any suitable conventional type of progressive jack may be successfully utilized with my structure, the jack J as shown, having a narrow, upstanding box-like casing 19 which surrounds the post 12 and is related therewith to retain the jack against oscillation relative to the post. The top of the casing 18 is welded or otherwise affixed to the slide tube 13 as previously mentioned. Within the casing 19 in conventional manner, a rack-engaging dog 20 is mounted having one end thereof pivoted between the sides of the casing and being also pivoted to the head 21a of the jack operating member which is actuated by an outwardly extending handle 21. The extremity of the dog 20 is adapted to progressively engage the rack teeth 12a of the jack post 12 to progress the jack upwardly upon reciprocation of handle 21. A conventional shift lever 22 (see Fig. 1) is provided for changing the position of the dog 20 to permit the jack to be downwardly retracted by reciprocating movement of the handle 21.

Jack J at its edge opposite to the position of handle 21 rigidly carries a laterally projecting log-engaging prong 19b for penetrative engagement with the underside of a log or branch.

A bowed biasing spring 23 is secured at its ends to the top of inverted channel base B with its intermediate portion disposed directly below the lower extremity of the jack post 12 to yieldingly retain the jack post in a compacted position parallel against the base. An upstanding spring-retaining lug 10b is affixed to one end of the top of base B for engagement with one of the convolutions of spring 18 when the jack post is collapsed with the upper section or push tube 14 removed to prevent lateral displacement of the spring from its mounting tube or slide tube 13.

Operation

One application of my tree felling device is illustrated in Fig. 1, this view indicating the positioning of my device after the tree trunk has been cut beyond half way with the consequent tilted position of the tree after such cutting and prior to felling thereof. In Fig. 1 with my structure positioned as shown and with the cut formed in the manner illustrated, my device is adapted to cause the tree to be felled generally along a plane intersecting the plane defined by the axis of my thrust pole and the longitudinal center line of the tree before the cut is made. In other words, in the application of my structure illustrated in Fig. 1, the tree will not be felled in the direction of thrust imparted by my structure but will be felled generally along a plane disposed intermediately of the direction of the thrust of my device and the original standing position of the tree.

In the majority of cases where the tree or other object to be felled stands substantially erect, my felling device is applied to transmit thrust directly in line with the intended falling movement of the tree and the cut is made in the trunk of the tree starting substantially at a point intersecting the plane defined by my felling jack and the general center line of the tree trunk.

In applying my felling device, the jack is preferably retracted to a substantially low position on the jack post 12 with the heavier coil spring 18 disposed below and out of engagement at its upper end with the thrust-receiving collar 14a of the thrust pole section. The prongs of the thrust head 17 are applied against the appropriate portion of the tree trunk or heavy branches emanating therefrom and the positioning of the pole and its anchoring base B is then determined according to the particular requirements.

The anchoring base B is then seated in the ground by penetration of the ground-penetrating blades 10a with the ground at the tree side of the jack structure. In so anchoring the device, sufficient tension is placed upon the light, internal spring 15 to hold the parts in operative relation with the prongs 17a engaged with the tree.

Thereafter, the location of the cut is determined by relation of the positioning of the thrust pole, tree and ground position to receive the felling. Jack J is then operated by reciprocating the handle 21 to apply the necessary pressure through internal spring 15 and the thrust pole section 14. If the tree is light and only a small amount of thrust is required to fell the same in the direction desired, the jack is manipulated only to the extent to apply pressure yieldingly and resiliently through the internal spring 15. In the case of larger trees, additional pressure is applied by progressively elevating the jack to a point where the spring 18 mounted on the slide tube 13 engages the lower end or collar 14a of the thrust pole section, producing compression on this spring and resiliently applying thrust against the pole 14.

It will be obvious that with the cooperation of the slidably related parts 12, 13 and 14, and the combinative action of the two thrust-applying springs 15 and 18, a great variance in applied thrust may be obtained as required in various conditions.

As the trunk of the tree is progressively cut by power saw or axe, thrust is continued upon the upper portion of the trunk although that thrust decreases as the tree itself tilts slightly from its original standing position. In this connection the relationship of the longitudinally adjustable sections of the thrust beam with the combination and differential relation of the two springs 15 and 18, produces in the majority of operations, a heavy, supporting thrust through spring 18 to retain the tree during cutting so that the kerf is open and the saw is not gripped by the sides of the cut. The lighter spring 15 initially compressed during adjustment of the jack and contracted linearly to a much greater extent than heavy spring 18, provides the follow through push near the completion of the cut to topple the tree and direct its fall.

In cases where a tree, column or other object to be felled leans considerably from the vertical, my felling jack is positioned to apply thrust upwardly from a point of anchorage beneath the overhanging portion of the tree. In other words, in such instances, the felling jack in its relation with the tree has the function of an A-frame, the heavy coil spring 18 being compressed by upward adjustment of jack J to bear during the cutting operation, a considerable part of the weight of the tree. The cut is then made not in line with the felling jack and the center of the tree but at one side of the tree as related to the plane defined by said lines and the tree falls, not in the direction of application of thrust but at an angle varying from 30 degrees up to ninety degrees, relative to the plane defined by the general center line of the tree and the thrust beam. In this connection, the swingable connection of the lower end of jack post 12 with the base and the penetrative engagement of the prongs 17a or 17b with the tree, is very important. The spaced prongs prevent the tree from rolling out of engagement with the thrust head while the pivoted lower end of the thrust beam facilitates swinging of this beam to exert proper thrust for guiding during the toppling and falling of the tree.

After an operator has used my felling jack on a few trees, he will become familiar with the proper adjustment of the jack to suit the various conditions. In most instances, the jack is adjusted to initially contract the small spring 15 to a considerable extent and thereafter, further elevation of the jack J produces initial compression of the heavy spring 18 (readily detected by the increased effort required to reciprocate the jack handle). The operator tensions the heavy spring 18, dependent upon the necessary supporting function required to apply sufficient upward pressure for preventing the tree from tilting backwardly against the cut to close the kerf and obstruct the saw or axe. As previously stated, the tensioning of the more contractile or smaller spring 15 is relied upon to provide the follow through in the toppling action. If the large spring 18 is considerably over tensioned in the adjustment of the jack, the side of the tree opposite the cut may break away too soon, the fracture causing a long strip of timber or other material to break away from the trunk which of course, is undesirable. With my improved structure, due to the differential spring construction and relation of the two springs, thrust is applied to positively maintain the kerf in desired open relation and to exert necessary power to maintain the tree erect during the cutting while a lighter and longer thrust is obtained through the light spring 15 to topple the tree and follow through to direct the fall.

My structure, as disclosed herein, while primarily intended for accurately felling a tree, also provides a timber jack for engaging and lifting a log, branch or other article to facilitate transverse cutting thereof, removal of branches or to lift the timber or article for other purposes such as loading. In this connection, it will be noted that the thrust pole section 14 and its carried internal spring 15 may be very quickly detached from the jack post 12 and slide tube 13 and that also the heavier coil spring 18 if desired, may be slipped off the end of the slide tube, leaving as shown in Fig. 5, the jack structure and slide tube connected with the anchoring base B. The jack structure may then be utilized to quickly engage and elevate a piece of timber or other article by properly seating the base B upon the ground and engaging the lifting arm 19a below the timber or other article. Thereafter, the jack may be actuated to lift and support the article. This use of my device greatly facilitates the trimming of branches and dissection of the tree, log or other article. As shown in Fig. 5, a timber has been elevated with my structure and is being transversely cut by a disc saw S.

From the foregoing description, it will be seen that I have provided a directional, tree-felling device for imparting and continuing to impart a thrust against an upper portion of a tree from a point of ground anchorage.

It will be noted that in positioning my structure for operation upon a tree or other object to be felled, the entire post assembly comprising the jack post 12, the slide tube 13 and the outer thrust pole section 14 may be tilted bodily for installation and for subsequent swinging and felling of the tree upon the pin 11a pivotally connecting the lower end of the jack post with the ground-anchoring base.

It will further be seen that with my structure, a very wide adjustment of resilient thrust pressure is provided for effectively felling trees varying in size and dimensions.

While my structure has been conceived primarily for use upon trees to directionally control the felling thereof, it will of course be understood that the device is well suited to direct and control felling of other objects such as posts, girders or walls in the wrecking of buildings and in other analogous work.

It will of course be understood that various changes may be made in the form, details, arrangement and proportions of the parts without departing from the scope of my invention.

What I claim is:

1. Felling structure for trees and other upstanding objects having in combination an elongated thrust-applying structure comprising at least a pair of sections slidably related for extension or retraction, the lower of said sections having penetrating ground-engaging means attached thereto and the upper of said sections having means for engaging a tree or other object at a point of elevation above the ground, a jack mechanism mounted on one of said sections for progressive adjustment longitudinally thereof and having connected therewith a spring abutment seat, the other of said sections having a cooperative spring abutment seat and an elongated coil spring mounted on one of said sections and interposed between said two spring abutment seats whereby tension may be applied to said outer section after the structure has been interposed between a point of anchorage and a point of engagement with the object to be felled.

2. The structure set forth in claim 1 and a second set of cooperating spring abutment seats, one thereof being connected with said jack for adjustment longitudinally of both sections and the second of said seats being carried by the section of the structure which does not have mounted thereon the jack mechanism and a coil spring interposed between said last mentioned pair of seats.

3. The structure set forth in claim 1, and the ground-engaging means of said lower section comprising a channeled base having at its top pivotal connection with the lower end of said lower section to facilitate free swinging of said thrust-applying structure and having a plurality of ground-penetrating prongs.

4. Felling structure for trees and other upstanding objects having in combination an elongated, thrust-applying structure comprising at least a pair of sections slidably related for extension or retraction, the lower of said sections having ground-engaging means attached thereto and the upper of said sections having means for engaging a tree or other object at a point of elevation above the ground, a jack mechanism mounted on said lower section for progressive adjustment longitudinally thereof, a pair of thrust seats fixed to said upper section, a pair of coil springs mounted on said thrust-applying structure and interposed between said jack mechanism and said thrust seats connected with said upper section, the relationship and lengths of said springs and the mountings thereof being such that one of said springs is first initially compressed and tensioned through upward progression of said jack mechanism after the structure has been interposed between a point of anchorage and a point of engagement with the object to be felled and whereafter, upon further upward progressive adjustment of said jack mechanism, said first spring is further compressed and said second spring compressed and tensioned.

5. The structure set forth in claim 4 wherein said first spring is more readily compressible and is contractible through greater length than said second spring.

6. A felling device for trees and other upstanding objects having in combination an elongated thrust-applying beam comprising at least a pair of sections having telescopic relation for extension or retraction, a jack mechanism mounted on the lower of said sections for progressive adjustment longitudinally thereof, said upper section being tubular and having mounted therein an elongated coil spring, the upper end of said spring being connected with said upper section, said jack mechanism carrying an upwardly extending, thrust-applying element telescoped within said upper section and having a thrust seat adapted for engagement with the lower end of said coil spring and a second coil spring surrounding said upwardly extending thrust-applying element and interposed between said jack device and said upper section.

7. The structure set forth in claim 6 and said first coil spring being of somewhat greater length than and being more readily contractible than said second coil spring.

8. Felling structure for trees and other upstanding objects having in combination an elongated thrust applying structure comprising a base provided with ground-anchoring means, a rigid jack post shiftably secured to said base and normally disposed in upstanding relation thereto, a jack mechanism mounted on said jack post for progressive adjustment longitudinally thereof, said jack mechanism carrying an upstanding supporting tube, an upper felling section slidably mounted upon said supporting tube and having a spring abutment disposed in the intermediate portion thereof, a coil spring mounted upon said thrust-applying structure and interposed between said supporting tube and said spring abutment whereby when said thrust-applying structure is interposed between a point of anchorage and a point of engagement with the object to be felled upward progression of said jack mechanism upon said jack post will tension said coil spring to resiliently apply thrust longitudinally of said upper section.

9. Felling structure for trees and other upstanding objects having in combination a base having depending ground-engaging anchoring means, a rigid jack post swingably connected with the upper portion of said base, a jack mechanism mounted on said post for progressive adjustment longitudinally thereof, a lower thrust section carried by said jack mechanism, an upper thrust section slidably mounted upon said lower section for longitudinal adjustment relative thereto, one of said sections having an elongated coil spring mounted therein and extending into said other section, said last mentioned section having a spring abutment therein, said upper section having external means defining another spring abutment seat and a second coil spring of a different length than said first mentioned spring surrounding said lower section and having its lower end abutting said jack mechanism.

MARCELLUS L. JACOBS.

REFERENCES CITED

The following references are of record in the file of this patent:

UNITED STATES PATENTS

| Number | Name | Date |
|---|---|---|
| 1,410,380 | Daniels | Mar. 21, 1922 |
| 1,482,846 | Harrah | Feb. 5, 1924 |
| 2,229,521 | Pinkham | Jan. 21, 1941 |
| 2,404,655 | Randall | July 23, 1946 |